United States Patent
Chengalvarayan et al.

(10) Patent No.: US 7,881,929 B2
(45) Date of Patent: Feb. 1, 2011

(54) AMBIENT NOISE INJECTION FOR USE IN SPEECH RECOGNITION

(75) Inventors: Rathinavelu Chengalvarayan, Naperville, IL (US); Timothy J. Grost, Clarkston, MI (US)

(73) Assignee: General Motors LLC, Detroit, MI (US)

( * ) Notice: Subject to any disclaimer, the term of this patent is extended or adjusted under 35 U.S.C. 154(b) by 859 days.

(21) Appl. No.: 11/828,093

(22) Filed: Jul. 25, 2007

(65) Prior Publication Data

US 2009/0030679 A1    Jan. 29, 2009

(51) Int. Cl.
*G10L 15/20* (2006.01)
(52) U.S. Cl. ....................... 704/233; 704/226
(58) Field of Classification Search ............... 704/226, 704/231–257
See application file for complete search history.

(56) References Cited

U.S. PATENT DOCUMENTS

| | | | | |
|---|---|---|---|---|
| 4,811,399 A | * | 3/1989 | Landell et al. | 704/253 |
| 5,890,111 A | * | 3/1999 | Javkin et al. | 704/226 |
| 6,889,189 B2 | * | 5/2005 | Boman et al. | 704/270 |
| 7,107,214 B2 | * | 9/2006 | Nakatsuka | 704/244 |
| 7,337,113 B2 | * | 2/2008 | Nakagawa et al. | 704/233 |
| 7,490,038 B2 | * | 2/2009 | Fado et al. | 704/231 |
| 2003/0040908 A1 | * | 2/2003 | Yang et al. | 704/233 |

* cited by examiner

*Primary Examiner*—Abul Azad
(74) *Attorney, Agent, or Firm*—Anthony Luke Simon; Reising Ethington P.C.

(57) ABSTRACT

A method of ambient noise injection for use with speech recognition in a production vehicle. The method includes the steps of monitoring audio including user speech, receiving an utterance from the user speech, retrieving vehicle-specific ambient noise, and prepending the vehicle-specific ambient noise to the utterance before pre-processing and decoding the utterance.

16 Claims, 5 Drawing Sheets

AMBIENT NOISE INJECTION FOR USE IN SPEECH RECOGNITION

TECHNICAL FIELD

This invention relates to speech signal processing and, more particularly, to automated speech recognition (ASR).

BACKGROUND OF THE INVENTION

ASR technologies enable microphone-equipped computing devices to interpret speech and thereby provide an alternative to conventional human-to-computer input devices such as keyboards or keypads. A typical ASR system includes several basic elements. A microphone and an acoustic interface receive an utterance of a word from a user, and digitize the utterance into acoustic data. An acoustic pre-processor parses the acoustic data into information-bearing acoustic features. A decoder uses acoustic models to decode the acoustic features into utterance hypotheses. The decoder generates a confidence value for each hypothesis to reflect the degree to which each hypothesis phonetically matches a subword of each utterance, and to select a best hypothesis for each subword. Using language models, the decoder concatenates the subwords into an output word corresponding to the user-uttered word.

Users of ASR systems sometimes utter commands to an ASR system before the system is ready to receive the command. For example, a user activates an ASR system, the system plays back a "Ready" prompt that the system is ready to receive commands, and a short time later the system initiates a listening period during which it is able to receive and record commands. So when users prematurely enunciate a command before the listening period has begun, the system hears only a portion of the uttered command and, thus, has difficulty understanding the utterance.

The present inventors discovered that premature enunciation causes ASR parameters to become maladjusted. ASR decoders assume that a first few frames of acoustic data after the Ready prompt are merely ambient noise. So when those first few frames instead include a partial utterance, actual values for noise suppression, channel compensation, and speech/silence detection parameters diverge from expected parameter values. This divergence causes an extended timeout period including decoder readjustment, and an error response of "Slower Please" followed by replay of the Ready prompt. The present inventors also discovered that the problem is exacerbated by such long delays, which cause users to speak even more prematurely and much louder.

SUMMARY OF THE INVENTION

The present invention provides a method of ambient noise injection for use with speech recognition in a production vehicle. In accordance with one embodiment, the method includes the steps of:

monitoring audio including user speech;

receiving an utterance from the user speech;

retrieving vehicle-specific ambient noise; and prepending the vehicle-specific ambient noise to the utterance before pre-processing and decoding the utterance.

This method improves speech recognition performance by processing audio so that speech recognition decoding does not become maladjusted.

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

Figure 1:
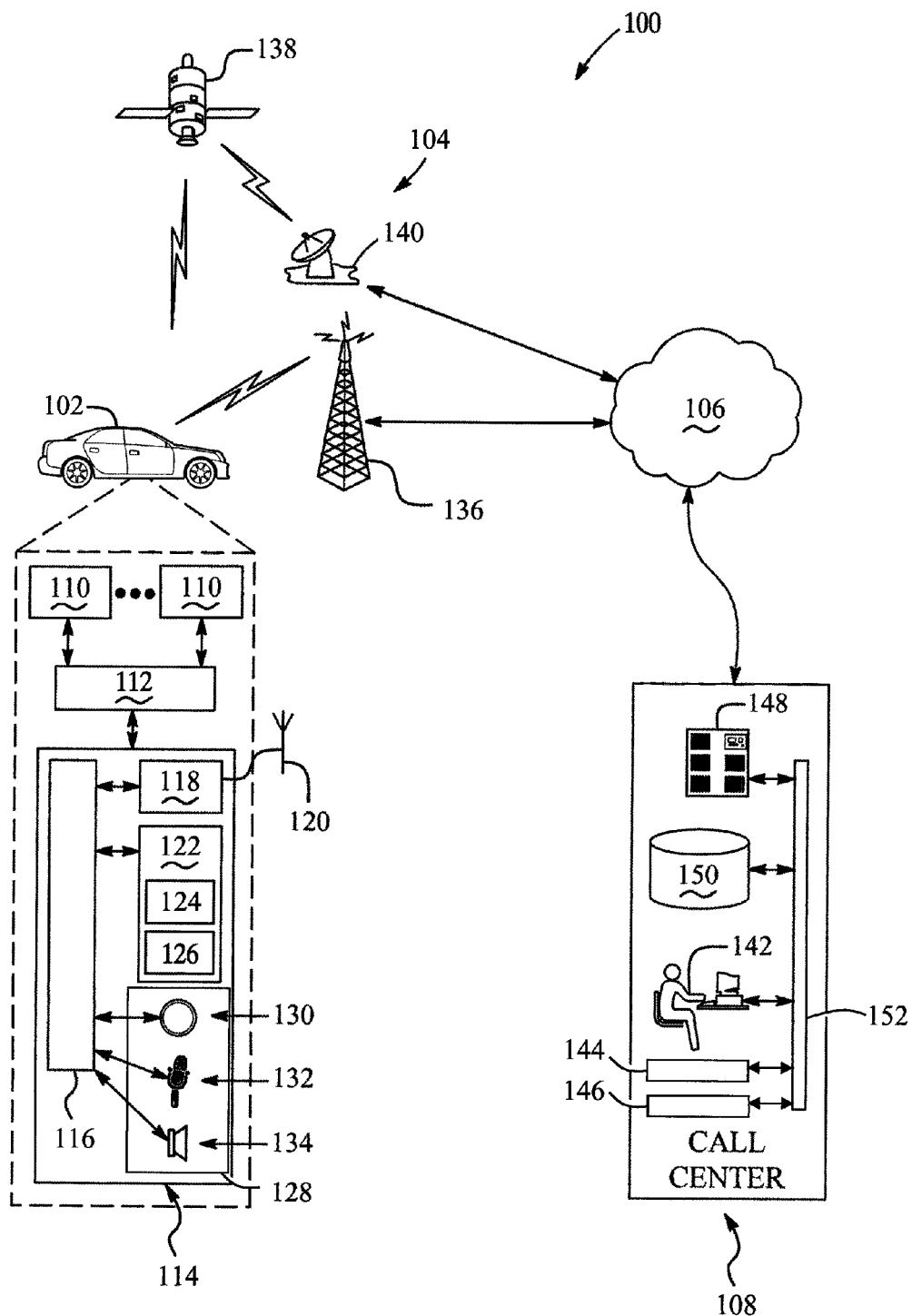
FIG. 1 is a block diagram depicting an example of a telematics system that can be used to implement exemplary methods of speech recognition.

An exemplary operating environment is illustrated in FIG. 1, and can be used to implement a presently disclosed method of ambient noise injection to improve speech recognition. The method can be carried out using any suitable telematics system and, preferably, is carried out in conjunction with a vehicle telematics system such as system 100. Those skilled in the art will appreciate that the overall architecture, setup, operation, and individual components of the system 100 are generally known in the art. Thus, the following system description simply provides a brief overview of one such exemplary telematics system, but other systems and components not shown here could also support the presently disclosed method.

The exemplary telematics system 100 includes a vehicle 102 for carrying one or more occupants or users, and a wireless communication system 104 for providing wireless communication to and from the vehicle 102. Also, the system 100 can include a second communications system 106 for communicating the wireless communication system 104 with a web server (not shown) and/or a call center 108 of the system 100 that provides services to the vehicle 102.

The system 100 can generally facilitate one or more suitable services for vehicle occupants such as vehicle navigation, turn-by-turn driving directions, infotainment, emergency services, vehicle diagnostics, vehicle system updates, and hands-free telephony and vehicle interaction using automatic speech recognition. For this purpose, the system 100 processes data and instructions as well as facilitates wireless voice and data transfer between hardware located on the vehicle 102 and hardware in the remote call center 108. For example, the system 100 enables vehicle occupants to initiate voice communication with the call center 108 or the service center 111.

Vehicle

The vehicle 102 is depicted in the illustrated embodiment as a passenger car, and it will be appreciated that any other vehicles including motorcycles, marine vessels, aircraft, recreational vehicles, and other automobiles such as vans, trucks, or the like, can be used without departing from the scope of the invention. Various electronic modules can be located on the vehicle 102 and include one or more vehicle system modules (VSMs) 110, an on-board vehicle communication bus 112, and one or more vehicle telematics units 114 connected by the bus 112 to the VSMs 110.

The VSMs 110 facilitate any suitable on-board functions such as vehicle diagnostics, monitoring, control, reporting, and/or other functions. For example, the VSMs 110 can be used for controlling engine operation, monitoring and deploying air bags or other safety devices, and/or diagnosing vehicle systems via various vehicle sensors. The VSMs 110 broadly represent any software, electronic, or electromechanical subsystems, and related sensors or other components throughout the vehicle with which the telematics unit 114 interacts. In a specific example, if the call center 108 sends a signal to the vehicle 102 to unlock the vehicle doors, then the telematics unit 114 instructs an electromechanical door lock VSM to unlock the doors.

The vehicle communication bus 112 facilitates interactions among various vehicle systems, such as the VSMs 110 and/or the telematics unit 114, and uses any suitable network communication configuration whether wired or wireless. Suitable interfaces can be interposed between the bus 112 and the various vehicle systems. As used herein, the term interface broadly means any suitable form of electronic device or adapter, or even a software module or adapter, to enable one piece of equipment to communicate with or control another piece of equipment. A few examples of buses include a Controller Area Network (CAN), Media Oriented System Transport (MOST), Local Interconnect Network (LIN), Ethernet (10baseT, 100baseT), Local Area Network (LAN), a wireless area network (WAN), and/or any suitable International Standard Organization (ISO) or Society of Automotive Engineers (SAE) communication standards.

The vehicle telematics unit 114 facilitates communication and other services between the vehicle 102 or occupants thereof, and various remote locations including the call center 108. The telematics unit 114 interfaces with the various VSMs 110 via the vehicle communication bus 112. The telematics unit 114 can be implemented in any suitable configuration, but can include a processor 116, a communications device 118 for wireless communication to and from the vehicle 102 via one or more antennas 120, a memory 122 to store computer programs 124 and/or one or more databases 126, and a user interface 128. The telematics unit 114 also includes any suitable interface(s) for intercommunicating the aforementioned devices.

Although depicted in FIG. 1 as separate individual modules, it will be appreciated by those skilled in the art that many of the components of the telematics unit 114 can be integrated together, or integrated and/or shared with other vehicle systems. For example, the memory 122 can be incorporated into the processor 116 or located outside of telematics unit 114 and shared with one or more other vehicle systems such as a vehicle central processing unit. Although the VSMs 110 are shown separate from the telematics unit 114, it is possible for any combination of these VSMs 110 to be integrated within the telematics unit 114. Furthermore, the telematics unit 114 could include additional components not shown, or could omit some of the components shown.

The telematics processor 116 is implemented in any of various ways known to those skilled in the art such as in the form of a controller, microprocessor, microcontroller, host processor, vehicle communications processor, Application Specific Integrated Circuit (ASIC), or as any other appropriate processor type. Alternatively, the processor 116 can work in conjunction with a central processing unit (not shown) performing the function of a general purpose computer. The processor 116 can be associated with other suitable devices and/or modules (not shown) such as a real time clock device to provide accurate date and time information, and/or a timer module to track time intervals.

The processor 116 executes the one or more programs 124 stored in memory 122 to carry out various functions such as system monitoring, data processing, and communicating the telematics unit 114 with the VSMs 110, vehicle occupants, and remote locations. For example, the processor 116 can execute one or more control programs and processes programs and/or data to enable a method of ambient noise injection, either alone or in conjunction with the call center 108. In another example, the processor 116 controls, generates, and accepts signals transmitted between the telematics unit 114 and call center 108, and between the telematics unit 114 and the vehicle communication bus 112 that is connected to the various VSMs 110. In one mode, these signals are used to activate programming and operation modes of the VSMs 110.

The telematics memory 122 can be any electronic storage device that provides computer-readable storage of data and programs for use by the processor 116. The memory 122 can include volatile, and/or non-volatile memory storage such as RAM, NVRAM, hard disks, flash memory, and/or the like, and can be implemented as one or more separate physical devices. The programs 124 include one or more computer programs that are executed as instructions by the processor 116 to carry out various functions of the telematics unit 114 such as messaging, diagnostics, communication, speech recognition, and/or the like. For example, the programs 124 resident in the memory 122 and executed by the processor 116 can be used to enable a method of ambient noise injection. The database 126 can be used to store message data, diagnostic trouble code data or other diagnostic data, vehicle data upload (VDU) records, event activation tables, speech recognition data, and/or the like. The database 126 can be implemented as database tables that enable lookups to be performed on data stored in the database 126, and this can be done using known indexing techniques, database queries, straight serial searching through such tables, and/or any other suitable storage and lookup techniques.

The telematics communications device 118 and associated antenna 120 transmits and receives voice and data to and from the wireless communication system 104 so that the telematics unit 114 can communicate with the call center 108 such as via the second communication system 106. The communications device 118 provides such wireless communication via cellular, satellite, and/or other wireless path, and can facilitate voice and/or data communication, wherein both voice and data signals can be sent and received over a voice channel and/or vice-versa. Those skilled in the art will recognize that the communications device 118 can transmit and receive data over a voice channel by applying any suitable type of encoding or modulation to convert digital data for communication through a vocoder or speech codec incorporated in a cellular chipset. Any suitable encoding or modulation technique that provides an acceptable data rate and bit error rate can be used. The communications device 118 can include any other suitable modules as discussed below.

The communications device 118 can include a telephony module including communications software and hardware such as a wireless modem and/or a mobile telephone. The mobile telephone can be any suitable wireless telephony device such as a mobile telephone, which can be analog, digital, dual mode, dual band, multi-mode, and/or multi-band. The mobile telephone can include a separate processor and memory, and/or a standard cellular chipset. Moreover, the mobile telephone can use any suitable cellular technology such as Advanced Mobile Phone System (AMPS), code division multiple access (CDMA), time division multiple access (TDMA), Global System for Mobile communications (GSM), or the like, but could also utilize proprietary or other wireless technologies to communicate with the wireless communication system 104.

The telematics user interface 128 includes one or more input and output interfaces to receive input from, and transmit output to, telematics users. As used herein, the term user includes telematics service subscribers, vehicle occupants including drivers and passengers, and the like. Also, as used herein, the term user interface broadly means any suitable form of electronic device or adapter, or even a software module or adapter, which enables vehicle occupants to communicate with or control another piece of equipment. The user interface 128 can include individual components distributed throughout the vehicle, and/or can be integrated as a single unit such as a human/machine interface (HMI), multi-media center, or the like. Multi-media centers can receive and store downloads of content such as music, webpages, movies, television programs, videogames, or the like, for current or delayed playback.

The input interfaces can include one or more tactile devices 130, one or more microphones 132, or any other types of input technology. First, the tactile input device 130 enables vehicle occupants to activate one or more functions of the telematics unit 114, and can include one or more pushbutton switches, keypads, keyboards, or other suitable input devices located within the vehicle 102 in reach of the vehicle occupants. For example, the tactile input device 130 can be used to initiate telecommunications with remote locations such as the call center 108 or mobile telephones and/or to initiate vehicle updates, diagnostics, or the like. Second, the microphone 132 allows vehicle occupants to provide vocal input to the telematics unit 114, and enables vocal communication with various remote locations via the communications device 118. Vocal input from vehicle occupants can be interpreted using a suitable analog-to-digital interface and/or digital signal processor such as a sound card (not shown) between the microphone 132 and the processor 116, and voice and speech recognition programs and data stored within the memory 122.

The output interfaces can include one or more speakers 134, a visual display device such as a liquid crystal display, plasma screen, touch screen, heads-up display, or the like (not shown), or any other types of visual output technology. The speakers 134 enable the telematics unit 114 to communicate audible speech, signals, audio files, or the like to vehicle passengers, and can be part of a vehicle audio system or stand-alone components specifically dedicated for use with the telematics unit 114. A suitable interface such as a sound card (not shown) can be interposed between the speakers 134 and the telematics processor 116.

Communication System(s)

The communication systems 104, 106 can be implemented separately or can be combined as an integral system. Also, with suitable equipment, the call center 108 can be wirelessly communicated directly to the wireless communication system 104 without the second system 106.

The wireless communication system 104 can include one or more analog and/or digital cellular networks 136, a wireless computer network such as a wide area network (WAN), wireless local area network (WLAN), broadband wireless area (BWA) network, and/or any other suitable wireless network used to transmit voice and/or data signals between the vehicle 102 and various remote locations such as the call center 108. The exemplary cellular network 136 can be implemented as a CDMA, GSM, or other cellular communication network that enables exchange of voice and data between the vehicle 102 and the second communication system 106. The network 136 can include any suitable combination of cell towers, base stations, and/or mobile switching centers (MSC). For instance, a base station and cell tower could be co-located at the same site or they could be remotely located from one another, each base station could service a single cell tower or multiple cell towers, and various base stations could be coupled to a single MSC, to name but a few of the possible arrangements. A speech codec or vocoder can be incorporated in the system 104, such as in one or more of the base stations, but depending on the particular architecture of the wireless network, it could be incorporated within an MSC or some other network component as well.

The system 104 can also or alternatively carry out wireless communication by satellite transmission using one or more satellites 138 to communicate the vehicle 102 with the call center 108 via a ground-based satellite transceiver 140. As an exemplary implementation, the satellite transceiver 140 and satellite(s) 138 can transmit radio signals to the vehicle 102. For example, a satellite transmission can be broadcast over a spectrum in the "S" band that has been allocated by the U.S. Federal Communication Commission for national broadcasting of satellite-based Digital Audio Radio Service (DARS). More specifically, satellite transmission can be carried out using XM™ brand satellite radio services.

The second communication system 106 can be a land-based wired system such as a public switched telephone network (PTSN), Internet Protocol (IP) network, optical network, fiber network, cable network, and/or utility power transmission lines. The system 106 can also be another wireless communication system like system 104, WAN, WLAN, or a BWA network, or any combination of the aforementioned examples, any of which can be used or adapted for voice and/or data communication.

Call Center

The call center 108 provides services to the vehicle 102 by processing and storing data, and communicating with the vehicle 102. The call center 108 can provide back-end functions to the vehicle telematics unit 114 and can include one or more fixed or mobile data centers in one or more locations. The call center 108 can include advisors 142 to monitor various vehicle conditions, respond to service requests, and provide vehicle services such as remote vehicle assistance in connection with in-vehicle safety and security systems. The advisors 142 can be implemented as live human advisors, or as automatons or computer programs responsive to user requests.

The call center 108 includes one or more voice and/or data interfaces 144 such as wired or wireless modems, switches such as private branch exchange (PBX) switches, and/or routers. The interface(s) 144 transmit and receive voice and/or data signals, such as by vehicle data uploads (VDUs), between the vehicle telematics unit 114 and the call center 108 through one or both of the communications systems 104, 106. For data-over-voice communication, the interface(s) 144 preferably apply some type of encoding or modulation to convert digital data for communication with a vocoder or speech codec.

The call center 108 can further include one or more communication service managers 146, one or more servers 148 to process data, one or more suitable databases 150 to store user data such as subscriber profiles and authentication data, and any other suitable data. The call center 108 can also include one or more wired and/or wireless networks 152 such as a LAN or WLAN, for connecting the call center components together along with the any computer(s) used by the one or more advisors 142. For example, the servers 148 and databases 150 execute and store one or more control programs and data to enable a method of ambient noise injection to improve speech recognition either alone or in conjunction with the telematics unit 114 of the vehicle 102. In other words, the presently disclosed method can be enabled by the telematics unit 114 of the vehicle 102, by the computing equipment and/or personnel in the call center 108, or by any combination thereof.

Exemplary ASR System

In general, a vehicle occupant vocally interacts with an automatic speech recognition system (ASR) for one or more of the following fundamental purposes: training the system to understand a vehicle occupant's particular voice; storing discrete speech such as a spoken nametag or a spoken control word like a numeral or keyword; or recognizing the vehicle occupant's speech for any suitable purpose such as voice dialing, menu navigation, transcription, service requests, or the like. Generally, ASR extracts acoustic data from human speech, compares and contrasts the acoustic data to stored subword data, selects an appropriate subword which can be concatenated with other selected subwords, and outputs the concatenated subwords or words for post-processing such as dictation or transcription, address book dialing, storing to memory, training ASR models or adaptation parameters, or the like.

Figure 2:
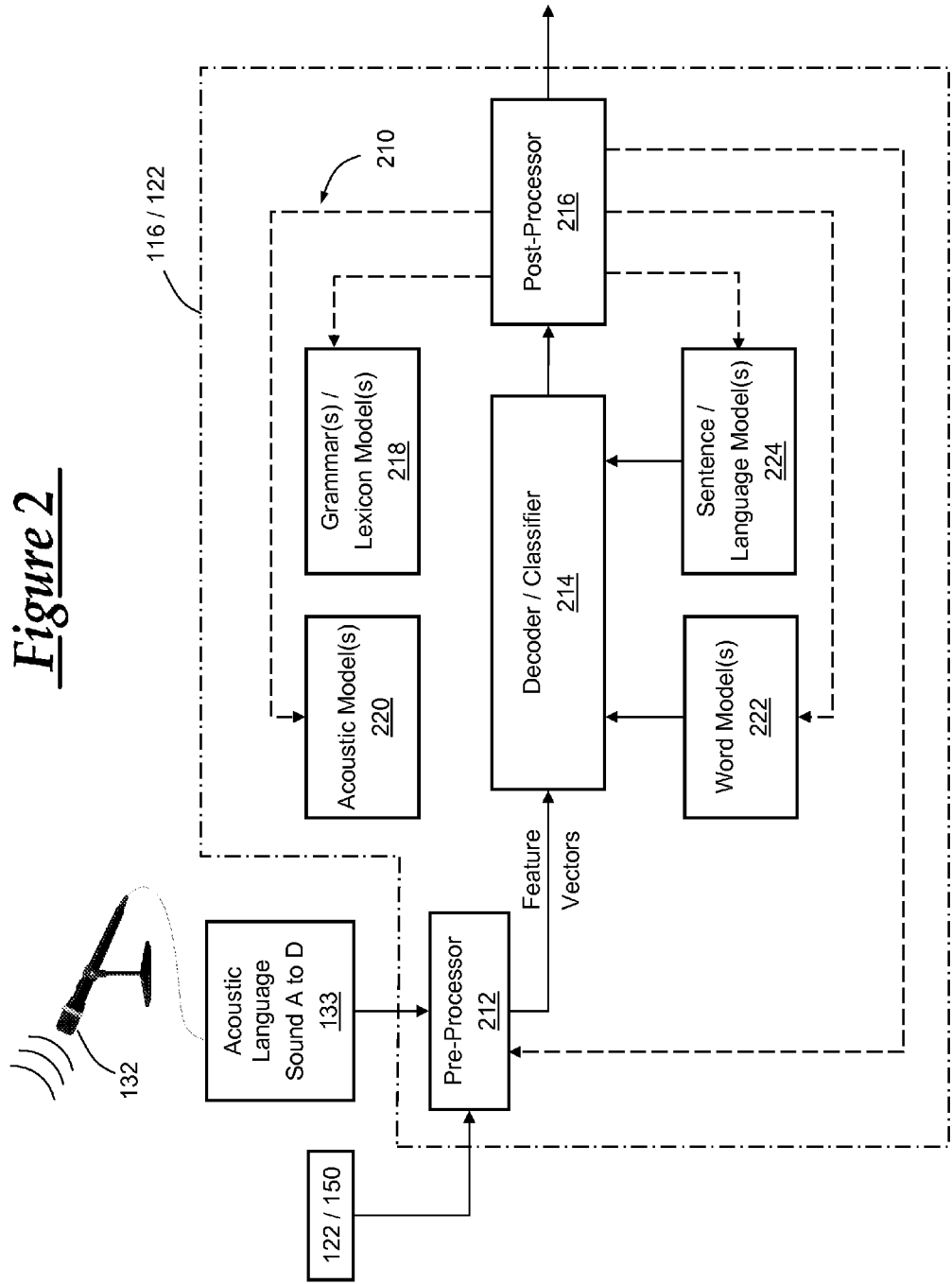
FIG. 2 is a block diagram illustrating an example ASR architecture that can be embedded within the telematics system of FIG. 1 and used to implement exemplary methods of speech recognition.

ASR systems are generally known to those skilled in the art, and FIG. 2 illustrates a specific exemplary architecture for an ASR system 210 that can be used to enable the presently disclosed method. The system 210 includes a device to receive speech such as the telematics microphone 132, and an acoustic interface 133 such as a sound card of the telematics user interface 128 to digitize the speech into acoustic data. The system 210 also includes a memory such as the telematics memory 122 for storing the acoustic data and storing speech recognition software and databases, and a processor such as the telematics processor 116 to process the acoustic data. The processor 116 functions with the memory and in conjunction with the following modules: a front-end processor or pre-processor software module 212 for parsing streams of the acoustic data of the speech into parametric representations such as acoustic features; a decoder software module 214 for decoding the acoustic features to yield digital subword or word output data corresponding to the input speech utterances; and a post-processor software module 216 for using the output data from the decoder module 214 for any suitable purpose.

One or more modules or models can be used as input to the decoder module 214. First, grammar and/or lexicon model(s) 218 can provide rules governing which words can logically follow other words to form valid sentences. In a broad sense, a grammar can define a universe of vocabulary the system 210 expects at any given time in any given ASR mode. For example, if the system 210 is in a training mode for training commands, then the grammar model(s) 218 can include all commands known to and used by the system 210. In another example, if the system 210 is in a main menu mode, then the active grammar model(s) 218 can include all main menu commands expected by the system 210 such as call, dial, exit, delete, directory, or the like. Second, acoustic model(s) 220 assist with selection of most likely subwords or words corresponding to input from the pre-processor module 212. Third, word model(s) 222 and sentence/language model(s) 224 provide rules, syntax, and/or semantics in placing the selected subwords or words into word or sentence context. Also, the sentence/language model(s) 224 can define a universe of sentences the system 210 expects at any given time in any given ASR mode, and/or can provide rules, etc., governing which sentences can logically follow other sentences to form valid extended speech.

According to an alternative exemplary embodiment, some or all of the ASR system 210 can be resident on, and processed using, computing equipment in a location remote from the vehicle 102 such as the call center 108. For example, grammar models, acoustic models, and the like can be stored in memory of one of the servers 148 and/or databases 150 in the call center 108 and communicated to the vehicle telematics unit 114 for in-vehicle speech processing. Similarly, speech recognition software can be processed using processors of one of the servers 148 in the call center 108. In other words, the ASR system 210 can be resident in the telematics system 114 or distributed across the call center 108 and the vehicle 102 in any desired manner.

First, acoustic data is extracted from human speech wherein a vehicle occupant speaks into the microphone 132, which converts the utterances into electrical signals and communicates such signals to the acoustic interface 133. A sound-responsive element in the microphone 132 captures the occupant's speech utterances as variations in air pressure and converts the utterances into corresponding variations of analog electrical signals such as direct current or voltage. The acoustic interface 133 receives the analog electrical signals, which are first sampled such that values of the analog signal are captured at discrete instants of time, and are then quantized such that the amplitudes of the analog signals are converted at each sampling instant into a continuous stream of digital speech data. In other words, the acoustic interface 133 converts the analog electrical signals into digital electronic signals. The digital data are binary bits which are buffered in the telematics memory 122 and then processed by the telematics processor 116 or can be processed as they are initially received by the processor 116 in real-time.

Second, the pre-processor module 212 transforms the continuous stream of digital speech data into discrete sequences of acoustic parameters. More specifically, the processor 116 executes the pre-processor module 212 to segment the digital speech data into overlapping phonetic or acoustic frames of, for example, 10-30 ms duration. The frames correspond to acoustic subwords such as syllables, demi-syllables, phones, diphones, phonemes, or the like. The pre-processor module 212 also performs phonetic analysis to extract acoustic parameters from the occupant's speech such as time-varying feature vectors, from within each frame. Utterances within the occupant's speech can be represented as sequences of these feature vectors. For example, and as known to those skilled in the art, feature vectors can be extracted and can include, for example, vocal pitch, energy profiles, spectral attributes, and/or cepstral coefficients that can be obtained by performing Fourier transforms of the frames and decorrelating acoustic spectra using cosine transforms. Acoustic frames and corresponding parameters covering a particular duration of speech are concatenated into unknown test pattern of speech to be decoded. In accordance, with the methods described below, the pre-processor module 212 may also receive vehicle-specific ambient noise data from memory such as the telematics memory 122 or call center database 150.

Third, the processor executes the decoder module 214 to process the incoming feature vectors of each test pattern. The decoder module 214 is also known as a recognition engine or classifier, and uses stored known reference patterns of speech. Like the test patterns, the reference patterns are defined as a concatenation of related acoustic frames and corresponding parameters. The decoder module 214 compares and contrasts the acoustic feature vectors of a subword test pattern to be recognized with stored subword reference patterns, assesses the magnitude of the differences or similarities therebetween, and ultimately uses decision logic to choose a best matching subword as the recognized subword. In general, the best matching subword is that which corresponds to the stored known reference pattern that has a minimum dissimilarity to, or highest probability of being, the test pattern as determined by any of various techniques known to those skilled in the art to analyze and recognize subwords. Such techniques can include dynamic time-warping classifiers, artificial intelligence techniques, neural networks, free phoneme recognizers, and/or probabilistic pattern matchers such as Hidden Markov Model (HMM) engines.

HMM engines are known to those skilled in the art for producing multiple speech recognition model hypotheses of acoustic input. The hypotheses are considered in ultimately identifying and selecting that recognition output which represents the most probable correct decoding of the acoustic input via feature analysis of the speech. More specifically, an HMM engine generates statistical models in the form of an "N-best" list of subword model hypotheses ranked according to HMM-calculated confidence values or probabilities of an observed sequence of acoustic data given one or another subword such as by the application of Bayes' Theorem.

A Bayesian HMM process identifies a best hypothesis corresponding to the most probable utterance or subword sequence for a given observation sequence of acoustic feature vectors, and its confidence values can depend on a variety of factors including acoustic signal-to-noise ratios associated with incoming acoustic data. The HMM can also include a statistical distribution called a mixture of diagonal Gaussians, which yields a likelihood score for each observed feature vector of each subword, which scores can be used to reorder the N-best list of hypotheses. The HMM engine can also identify and select a subword whose model likelihood score is highest. To identify words, individual HMMs for a sequence of subwords can be concatenated to establish word HMMs.

The speech recognition decoder 214 processes the feature vectors using the appropriate acoustic models, grammars, and algorithms to generate an N-best list of reference patterns. As used herein, the term reference patterns is interchangeable with models, waveforms, templates, rich signal models, exemplars, hypotheses, or other types of references. A reference pattern can include a series of feature vectors representative of a word or subword and can be based on particular speakers, speaking styles, and audible environmental conditions. Those skilled in the art will recognize that reference patterns can be generated by suitable reference pattern training of the ASR system and stored in memory. Those skilled in the art will also recognize that stored reference patterns can be manipulated, wherein parameter values of the reference patterns are adapted based on differences in speech input signals between reference pattern training and actual use of the ASR system. For example, a set of reference patterns trained for one vehicle occupant or certain acoustic conditions can be adapted and saved as another set of reference patterns for a different vehicle occupant or different acoustic conditions, based on a limited amount of training data from the different vehicle occupant or the different acoustic conditions. In other words, the reference patterns are not necessarily fixed and can be adjusted during speech recognition.

Using the in-vocabulary grammar and any suitable decoder algorithm(s) and acoustic model(s), the processor accesses from memory several reference patterns interpretive of the test pattern. For example, the processor can generate, and store to memory, a list of N-best vocabulary results or reference patterns, along with corresponding parameter values. Exemplary parameter values can include confidence scores of each reference pattern in the N-best list of vocabulary and associated segment durations, likelihood scores, signal-to-noise ratio (SNR) values, and/or the like. The N-best list of vocabulary can be ordered by descending magnitude of the parameter value(s). For example, the vocabulary reference pattern with the highest confidence score is the first best reference pattern, and so on. Once a string of recognized subwords are established, they can be used to construct words with input from the word models 222 and to construct sentences with the input from the language models 224.

Finally, the post-processor software module 216 receives the output data from the decoder module 214 for any suitable purpose. For example, the post-processor module 216 can be used to convert acoustic data into text or digits for use with other aspects of the ASR system or other vehicle systems. In another example, the post-processor module 216 can be used to provide training feedback to the decoder 214 or pre-processor 212. More specifically, the post-processor 216 can be used to train acoustic models for the decoder module 214, or to train adaptation parameters for the pre-processor module 212.

Method of Ambient Noise Injection

A method of ambient noise injection for use with speech recognition in a production vehicle is provided herein and can be carried out as one or more computer programs using the architecture of the ASR system 210 within the operating environment of the telematics system 100 described above. Those skilled in the art will also recognize that the method can be carried out using other ASR systems within other operating environments.

The method is provided to improve speech recognition performance by prepending vehicle-specific ambient noise to user utterances, so that speech recognition decoding does not become maladjusted. In general, audio including user speech is monitored, an utterance from the user speech is received, vehicle-specific ambient noise is retrieved and appended to the utterance before pre-processing and decoding of the utterance. Accordingly, speech recognition performance may be increased by such an improvement because streams of acoustic data are injected with vehicle-specific ambient noise to counter the degrading effects of prematurely enunciated utterances on a decoder.

Figure 3:
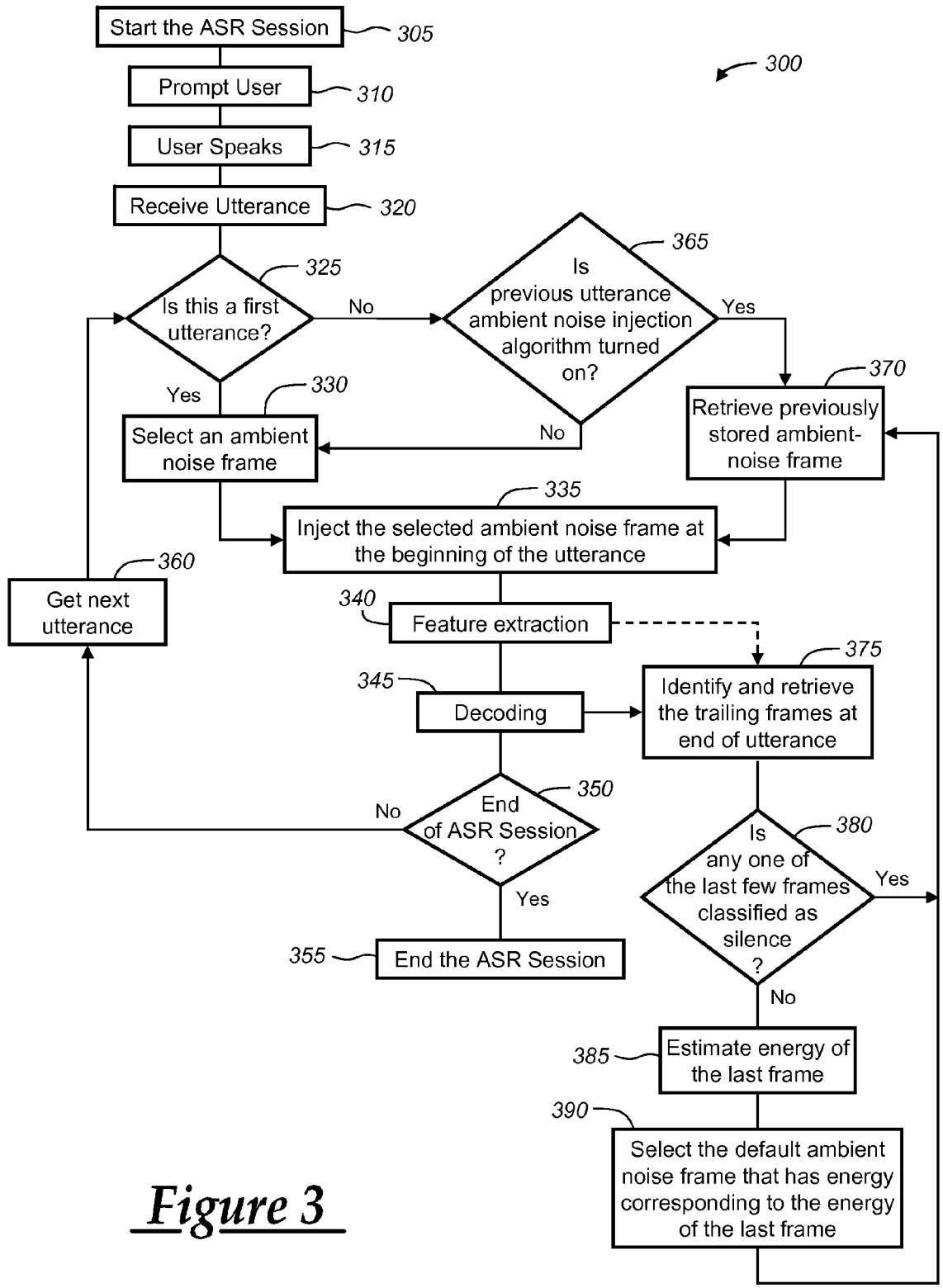
FIG. 3 is a flow chart of an embodiment of an exemplary ambient noise injection method, which can be carried out using the telematics system and ASR architecture of FIGS. 1 and 2.

FIG. 3 illustrates an exemplary method of ambient noise injection for use with in-vehicle speech recognition, as discussed in detail below.

At step 305, an ASR session can be initiated. For example, a user may press an activation button of the telematics unit 114 of the telematics system 100 to initiate a current ASR session.

At step 310, a user can be prompted to utter a command or otherwise begin speaking to an ASR system. For example, the ASR system 210 may play a recorded prompt such as "Ready" or may play a beep, flash a light, or the like.

At step 315, a user can begin speaking, or input an utterance, to an ASR system. For example, the user can say a command such as "Dial" or "Call." Sometimes, the user speaks before a prompt to do so is complete, or before the ASR system 210 begins a period of listening for user speech. Such premature enunciation can cause a downstream decoding process to become maladjusted unless action is taken as described below.

At step 320, audio can be monitored by an ASR system so that an utterance from a user can be received by the ASR system. For example, all or just a portion of the user's utterance from step 315 can be received by the ASR system 210. More specifically, where the user prematurely enunciated, only a portion of the user's utterance is received, such as "-ial" instead of "Dial" or "-all" instead of "Call."

At step 325, it can be determined whether or not speech received from a user is a first utterance. For example, it can be determined if the user's utterance is the first utterance ever input to the ASR system 210 after vehicle purchase, or the first utterance input for the current ASR session, or the like. If the determination is affirmative, then the method proceeds to step 330, otherwise to step 365.

At step 330, vehicle-specific ambient noise can be selected. For example, at least one vehicle-specific ambient noise frame can be selected using method 400 exemplified by FIG. 4 and described below.

At step 335, vehicle-specific ambient noise is injected into received audio, such that it is prepended to a user's utterance. For example, the selected vehicle-specific ambient noise frame from step 330 can be prepended to acoustic data corresponding to the user's utterance received in step 320 that can be buffered in memory in any suitable manner. In other words, the vehicle-specific ambient noise frame can be acoustic data that can be added to the beginning of acoustic data representative of the user's utterance from step 320. In another embodiment, more than one vehicle-specific ambient noise frame can be prepended, such three, nine, or any other multiple of a single vehicle-specific ambient noise frame. As used herein, the terminology prepending to a user's utterance can include placing or injecting the vehicle-specific ambient noise in any position before the user's utterance, whether immediately adjacent thereto, overlapping, or spaced in advance with respect thereto, or the like.

At step 340, acoustic data corresponding to a user's utterance and vehicle-specific ambient noise prepended thereto can be pre-processed. For example, the prepended acoustic data from step 335 can be pre-processed by the pre-processor 212 to extract any suitable acoustic features therefrom.

At step 345, acoustic features corresponding to a user's utterance prepended with vehicle-specific ambient noise can be decoded. For example, the pre-processed prepended acoustic data from step 340 can be decoded by the decoder 214 to produce any suitable output including a recognition result, hypotheses, speech labels, silence labels, and/or the like.

At step 350, it can be determined whether a current ASR session is complete. If so, the method ends at step 355 and, otherwise, a subsequent utterance can be retrieved at step 360, whereafter the method loops back to step 325.

At step 365, in accordance with another embodiment, it can be determined whether an adaptive ambient noise injection routine is enabled. If not, the method proceeds to step 330, otherwise, the method proceeds to step 370. Such a routine results in prepending a current user utterance with ambient noise trailing a previous user utterance within the current vehicle. This may result in a match in ambient noise that is more accurate than using test vehicle ambient noise.

At step 370, in-vehicle ambient noise corresponding to a previous utterance is retrieved. For example, an in-vehicle ambient noise frame can be one that is retrieved from memory and as previously recorded in association with an immediately preceding utterance, or can be a proxy therefor, as discussed below with respect to steps 375 et seq.

At step 375, trailing frames associated with a user's utterance can be identified and corresponding data can be retrieved. Any suitable quantity of trailing frames can be identified. The decoder 214 can distinguish speech from silence and can label each accordingly. Also, trailing frame speech data, such as raw digital acoustic data or acoustic features output from the pre-processor, can be retrieved. The post-processor 216 can be used to carry out any or all of steps 375 through 390 for feedback to the pre-processor 212 such as via step 370.

At step 380, it can be determined whether one or more trailing frames associated with a user's utterance include speech data. If so, the trailing frame(s) are stored and the method proceeds to step 385. But if not, then the trailing frames are considered to include speechless data and the method proceeds to step 370. Speechless data can be synonymous with ambient noise data, silence data, or the like.

At step 385, speech energies from at least one trailing frame associated with a user's utterance can be estimated. For example, speech energies from the last of the trailing frame(s) can be estimated using any suitable techniques for estimating speech energies. As just one of many specific examples, short-time energy techniques can be used to distinguish between voiced and unvoiced segments, because unvoiced segments have significantly smaller short-time energy.

At step 390, estimated speech energies from at least one trailing frame associated with a user's utterance can be compared to speech energies from a plurality of vehicle-specific ambient noise frames, and at least one of the vehicle-specific ambient noise frames best corresponding to the trailing frame(s) can be selected. The best corresponding vehicle-specific ambient noise frame(s) can then be retrieved at step 370.

Figure 4:
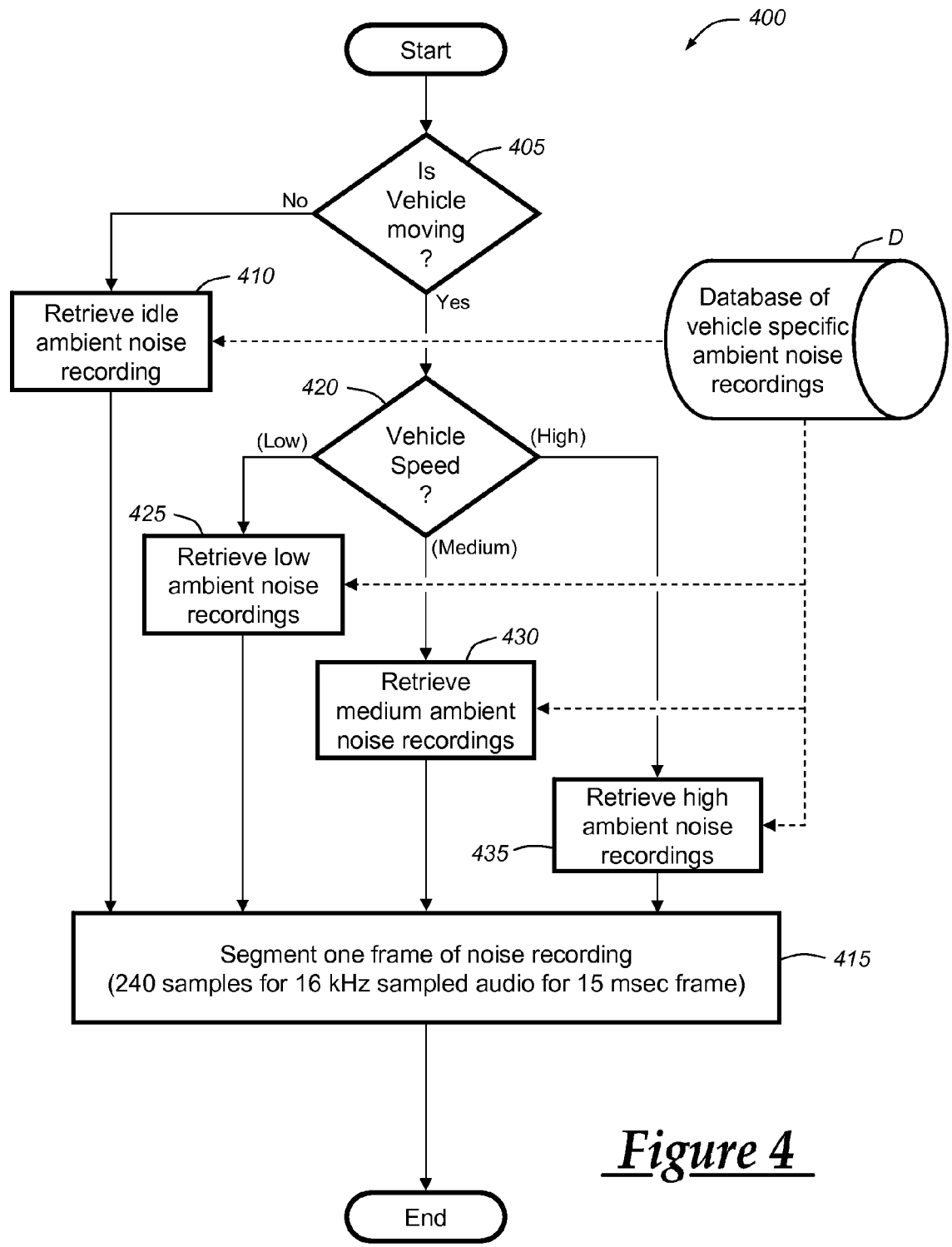
FIG. 4 is a flow chart of an embodiment of an exemplary vehicle-specific ambient noise collection method, which can be carried out using the telematics system and ASR architecture of FIGS. 1 and 2.

FIG. 4 illustrates an exemplary method 400 of selecting vehicle-specific ambient noise and is described in association with vehicle movement and vehicle speed parameters. This method 400 is merely one specific example that can be used for step 330 of FIG. 3 described with respect to method 300 above. Accordingly, other examples including any other suitable vehicle-specific parameters can be used that tend to affect in-vehicle ambient noise. For example, vehicle heating, ventilation, and air-conditioning (HVAC) parameters could be used, such as fan speed, outlet type (windshield defrost, dashboard vents, floor vents), or the like. In another example, window or sunroof opening parameters could be used. In fact, any conceivable vehicle setting or condition parameters could be used such as turn-signal on/off, radio or GPS on/off, radio or GPS volume magnitude, inaudible background speech, road type or condition, or the like. The collection of data for vehicle-specific ambient noise can be carried out in any suitable manner, such as using the exemplary method described below in conjunction with exemplary FIG. 5. The collected vehicle-specific ambient noise data can be stored in a database D, such as in the memory 122 of the telematics unit 114, in the database 150 of the call center 108, in both, or the like.

At step 405, it can be determined whether a vehicle in which ASR is being carried out is moving. If not, then the method proceeds to step 410, otherwise the method proceeds to step 420.

At step 410, if a vehicle is not moving, then recorded vehicle idle ambient noise data can be retrieved such as from the database D, and output for processing at step 415.

At step 415, recorded vehicle-specific ambient noise can be segmented into one or more frames of acoustic data. For example, vehicle-specific ambient noise recorded at a 16 kHz sampling rate can be segmented to yield a 15 ms frame including 240 samples.

At step 420, a current speed can be determined for a vehicle in which ASR is being carried out. For example, if the vehicle is traveling at less than 30 MPH, then the method can proceed to step 425, and if between 30 and 60 MPH, then the method can proceed to step 430, otherwise the method can proceed to step 435.

At step 425, pre-recorded low level vehicle-specific ambient noise can be retrieved from memory. For example, the low level ambient noise can be recorded in a test vehicle traveling between 0 and 30 MPH.

At step 430, pre-recorded medium level vehicle-specific ambient noise can be retrieved from memory. For example, the medium level ambient noise can be recorded in a test vehicle traveling between 30 and 60 MPH.

At step 435, pre-recorded high level vehicle-specific ambient noise can be retrieved from memory. For example, the high level ambient noise can be recorded in a test vehicle traveling at greater than 60 MPH.

Figure 5:
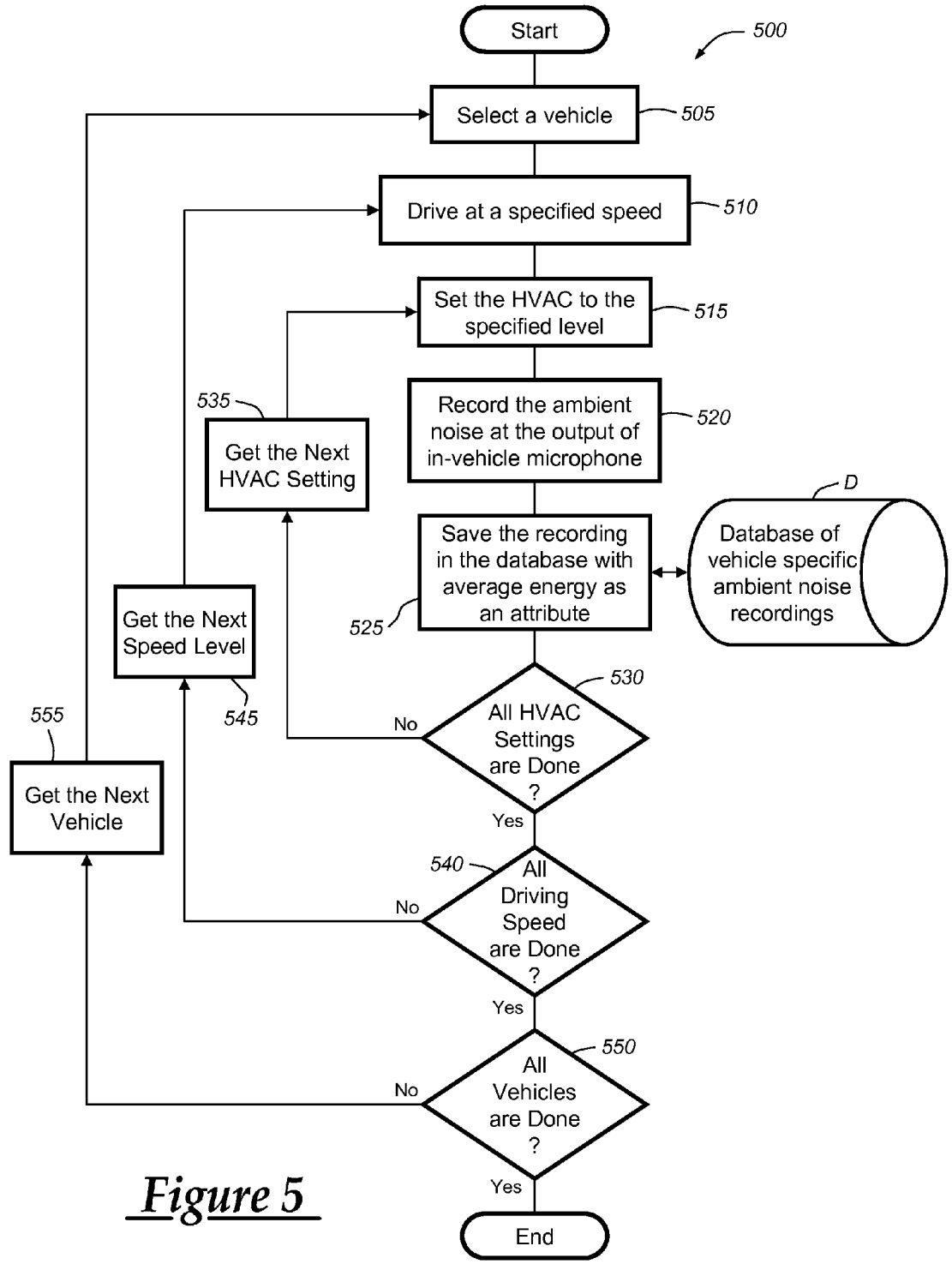
FIG. 5 is a flow chart of an embodiment of an exemplary vehicle-specific ambient noise retrieval method, which can be carried out using the telematics system and ASR architecture of FIGS. 1 and 2.

FIG. 5 illustrates an exemplary method of recording vehicle-specific ambient noise. The method is described in association with vehicle speed and HVAC setting parameters, but any other suitable vehicle-specific parameters can be used as previously set forth with respect to FIG. 4. Vehicle-specific ambient noise is influenced by several external and internal noises, such as the type of road the vehicle is traversing, the speed the vehicle travels, wind noise, noise external to the vehicle, HVAC settings, and many other factors. The vehicle-specific ambient noise can be comprised of ambient noise recordings within a vehicle at different speeds, along with varied interior and exterior ambient noise combinations. Example conditions for recording vehicle noise can include the vehicle traveling at 45 miles per hour over a segmented concrete road with the air conditioning system set at level three, or the vehicle traveling at 60 miles per hour on a blacktop surfaced road with the driver and passenger's windows lowered, or the like.

At step 505, a vehicle can be selected. The vehicle can be a test vehicle corresponding to the production vehicle in which ASR is to be carried out. The vehicle can be selected by make, and/or model, vehicle type, such as bus, truck, sedan, coupe, etc., or by segment such as luxury, sport, economy, etc. For types and segments, all vehicles of a type or segment can be selected and their ambient noise recordings averaged, or some subset of all vehicles in a type or segment can be selected such as one vehicle representative of a particular type or segment. In other words, test vehicles can be used, and can be of the same make and model as actual production vehicles in which ASR will be carried out, or can be the same type (car vs. truck vs. SUV vs. crossover vs. etc), or the like.

At step 510, a vehicle can be driven at a given speed. For example, during a first pass, the selected vehicle from step 505 can be driven at a particular speed such as about 15 MPH, or within a low range of 0-30 MPH. During a second pass, the selected vehicle can be driven at another speed such as about 45 MPH, or within a medium range of 30-60 MPH. During a third pass, the selected vehicle can be driven at yet another speed such as about 75 MPH, or within a high range of 60+ MPH. The vehicle may be driven at any desired speeds and/or within any number of ranges of speeds of any desired size, and may be motionless and/or idled.

At step 515, a vehicle HVAC setting can be selected. For example, during a first pass, the HVAC setting can be set to off for the vehicle selected in step 505 and driven in step 510. During a second pass, the HVAC setting can be set to a relatively low numerical value or within a low range or the like. During a third pass, the HVAC setting can be set to an intermediate numerical value or within a medium range or the like. During a fourth pass, the HVAC setting can be set to a relatively high numerical value or within a high range or the like. Any HVAC setting may be used, such as fan speed, vent location, or the like, and can be set to any desired level(s).

At step 520, ambient noise in a vehicle is recorded. For example, an integrated vehicle microphone (IVM) can be placed in a cabin of the vehicle selected in step 505, driven in step 510, and set in step 515. An IVM is a built-in microphone connected to a telematics unit and used during normal vehicle operation. Alternatively, one or more separate microphones can be placed in the cabin and communicated with any suitable audio recording equipment separate from the vehicle. In other words, the ambient noise can be recorded using built-in production vehicle equipment or using test equipment or instrumentation.

At step 525, a recording of ambient noise in a vehicle can be stored in memory. For example, the recording from step 520 can be stored in a database, which can be loaded to production vehicles corresponding to the test vehicle, such as of the same type or make/model as the test vehicle. In addition, other audio parameters besides raw ambient noise data can be stored with each recording. For example, average acoustic energy for each recording can be stored in association with each recording as an attribute thereof.

At step 530, it can be determined whether ambient noise in a vehicle has been recorded for all desired HVAC settings. If not, the method proceeds to step 535 wherein a next HVAC setting is obtained and then loops back to step 515. Otherwise, the method proceeds to step 540.

At step 540, it can be determined whether ambient noise in a vehicle has been recorded for all desired vehicle speeds. If not, the method proceeds to step 545 wherein a next vehicle speed is obtained and then loops back to step 510. Otherwise, the method proceeds to step 550.

At step 550, it can be determined whether ambient noise has been recorded for all desired vehicles. If not, the method proceeds to step 555 wherein a next vehicle is obtained and then loops back to step 505. The next vehicle can be the same type or make/model of vehicle where multiple test runs are carried out and averaged for a type or make/model of vehicle. Or the next vehicle can be a different type or make/model of vehicle. Otherwise, the method ends.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of ambient noise injection for use with speech recognition in a production vehicle, the method comprising the steps of:
    monitoring audio including user speech;
    receiving an utterance from the user speech;
    retrieving vehicle-specific ambient noise;
    prepending the vehicle-specific ambient noise to the utterance before pre-processing and decoding the utterance;
    pre-processing the utterance including the vehicle-specific ambient noise; and
    decoding the pre-processed utterance including the vehicle-specific ambient noise.

2. The method set forth in claim 1, wherein the vehicle-specific ambient noise was generated in at least one test vehicle of the same make and model as the production vehicle.

3. The method set forth in claim 1, wherein the vehicle-specific ambient noise was generated in at least one test vehicle of the same type as the production vehicle.

4. The method set forth in claim 1, wherein the vehicle-specific ambient noise was generated in at least one test vehicle of the same segment as the production vehicle.

5. The method set forth in claim 1, wherein the vehicle-specific ambient noise was generated according to a plurality of different vehicle speeds.

6. The method set forth in claim 1, wherein the vehicle-specific ambient noise was generated according to a plurality of different HVAC settings.

7. The method set forth in claim 1, wherein the vehicle-specific ambient noise was generated according to a plurality of different vehicle parameters.

8. The method set forth in claim 1, wherein the vehicle-specific ambient noise is from at least one trailing frame associated with a user utterance preceding the received utterance.

9. The method set forth in claim 1, wherein the vehicle-specific ambient noise was generated in at least one test vehicle corresponding to the production vehicle and is selected as a proxy for at least one trailing frame associated with a user utterance preceding the received utterance.

10. The method set forth in claim 1, further comprising the steps of:
    identifying at least one speechless frame trailing the utterance;
    storing the speechless frame(s);
    receiving a subsequent utterance from the user speech;
    retrieving the stored speechless frame(s); and
    prepending the speechless frame(s) to the subsequent utterance.

11. The method set forth in claim 1, further comprising:
    identifying no speechless frames trailing the utterance;
    estimating speech energies in at least one frame trailing the utterance;
    comparing the estimated speech energies with speech energies of frames having the vehicle-specific ambient noise, and which are pre-recorded in at least one test vehicle corresponding to the production vehicle;
    identifying at least one of the pre-recorded vehicle-specific ambient noise frames having speech energies corresponding to the estimated speech energies;
    storing the corresponding pre-recorded vehicle-specific ambient noise frame(s);
    receiving a subsequent utterance from the user speech;
    retrieving the stored pre-recorded vehicle-specific ambient noise frame(s); and
    prepending the retrieved pre-recorded vehicle-specific ambient noise frame(s) to the subsequent utterance.

12. A method of ambient noise injection for speech recognition in a production vehicle, the method comprising the steps of:
    initiating a current speech recognition session;
    monitoring audio including user speech;
    receiving an utterance from the user speech;
    determining that the received utterance is a first utterance following the initiation of the current speech recognition session;
    retrieving at least one vehicle-specific ambient noise frame from ambient noise frames pre-recorded in a test vehicle corresponding to the production vehicle;
    prepending the vehicle-specific ambient noise frame(s) to the utterance(s);
    pre-processing the utterance including the ambient noise frame(s); and
    decoding the pre-processed utterance including the ambient noise frame(s).

13. The method set forth in claim 12, further comprising the steps of:
    identifying at least one speechless frame trailing the utterance; and
    storing the speechless frame(s).

14. The method set forth in claim 13, further comprising the steps of:
    receiving a subsequent utterance from the user speech;
    retrieving the stored speechless frame(s); and
    prepending the speechless frame(s) to the subsequent utterance.

15. The method set forth in claim 12, further comprising the steps of:
    identifying no speechless frames trailing the utterance;
    estimating speech energies in at least one frame trailing the utterance;
    comparing the estimated speech energies with speech energies of the pre-recorded ambient noise frames;
    identifying at least one of the pre-recorded ambient noise frames having speech energies corresponding to the estimated speech energies; and
    storing the corresponding pre-recorded ambient noise frame(s).

16. The method set forth in claim 15, further comprising the steps of:
    receiving a subsequent utterance from the user speech;
    retrieving the stored pre-recorded ambient noise frame(s); and
    prepending the retrieved pre-recorded ambient noise frame(s) to the subsequent utterance.

* * * * *